United States Patent [19]

Leopold, Jr. et al.

[11] 3,763,880

[45] Oct. 9, 1973

[54] GATE VALVE STRUCTURE

[75] Inventors: Wilbur R. Leopold, Jr.; John J. Smith; Frank C. Hackman; Lawrence F. Luckenbill; Joseph L. Daghe, all of Decatur, Ill.

[73] Assignee: Mueller Co., Decatur, Ill.

[22] Filed: June 24, 1971

[21] Appl. No.: 156,531

Related U.S. Application Data

[62] Division of Ser. No. 880,996, Nov. 28, 1969, Pat. No. 3,633,873.

[52] U.S. Cl................. 137/316, 251/268, 251/214, 251/327
[51] Int. Cl............................................. F16k 41/06
[58] Field of Search.................... 251/268, 269, 291, 251/327, 214; 137/316, 315

[56] References Cited
UNITED STATES PATENTS

| | | | |
|---|---|---|---|
| 3,412,750 | 11/1968 | Volpin | 251/14 X |
| 178,492 | 6/1876 | Walter | 251/268 |

*Primary Examiner*—Arnold Rosenthal
*Attorney*—Cushman, Darby & Cushman

[57] ABSTRACT

A gate valve structure for use in mains carrying fluid under high pressure, the gate valve structure utilizing a non-rising stem type actuating mechanism. The non-rising actuating stem type mechanism includes telescoping stems threadedly engaging one another and in which the threads of the telescoping stems are protected or sealed from the main fluid at all positions of the gate valve. Additionally, the gate valve structure is provided with means for wiping at least the exterior surface of one stem which telescopes into the gate valve member to further protect the threads of the stems from foreign material, such as dirt, abrasives or the like. The top construction of the gate valve structure permits replacement of the upper stem seal in any position of the gate member, the construction also providing for a positive control of the positioning of the upper valve stem irregardless of normal manufacturing tolerances. Compensating spacer means insures a load being placed on the upper stem seal.

4 Claims, 6 Drawing Figures

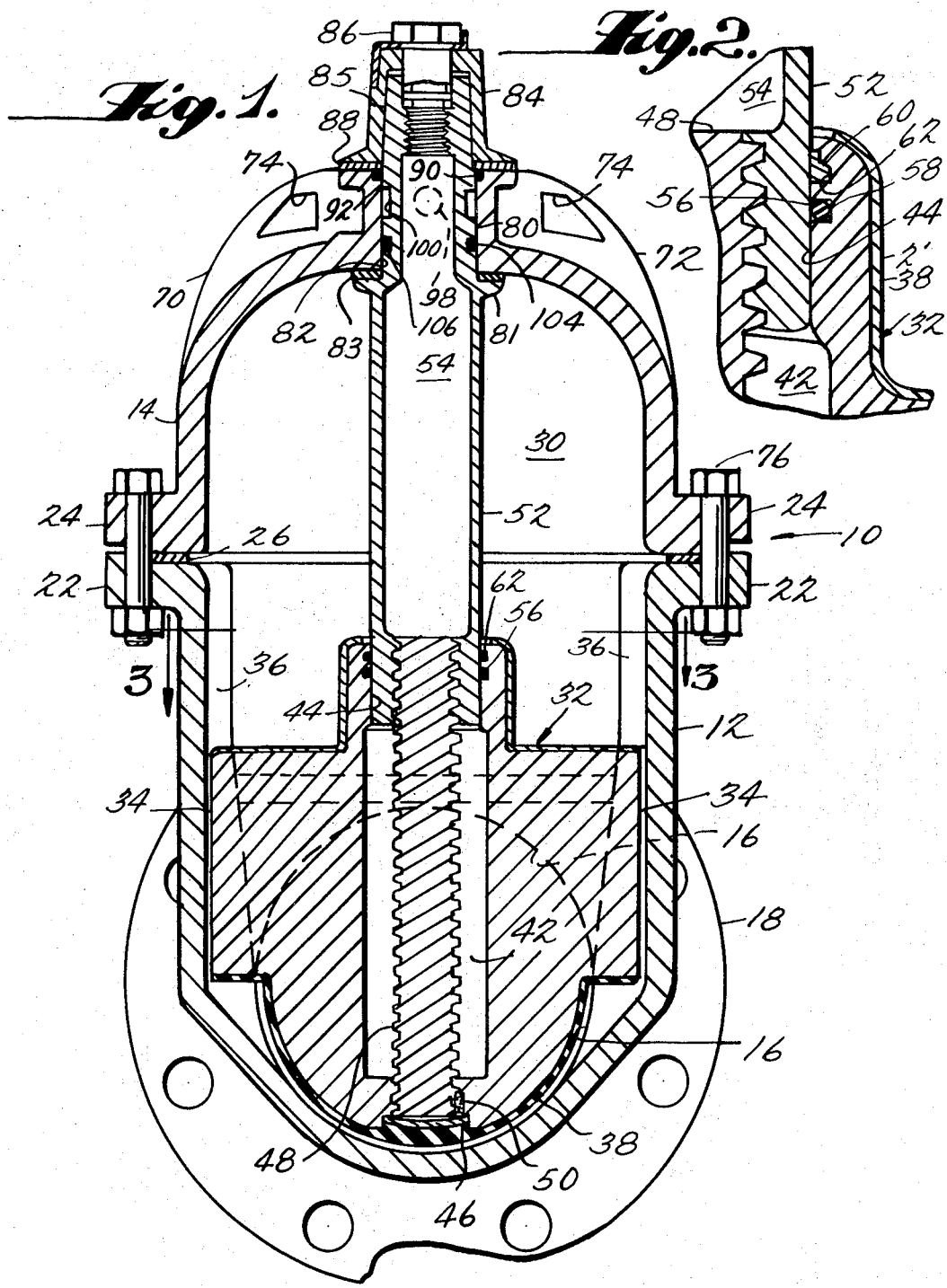

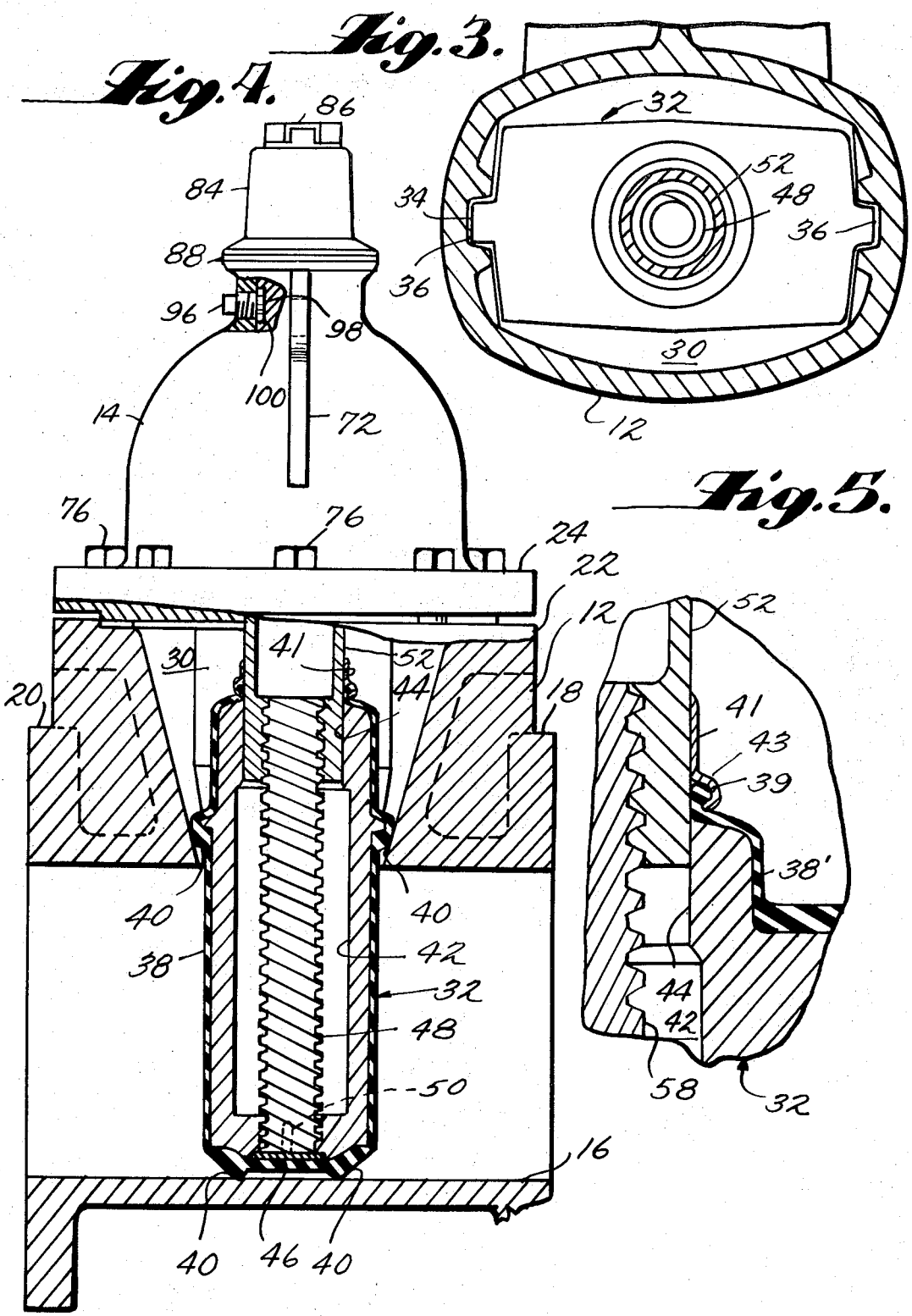

GATE VALVE STRUCTURE

This application is a divisional application of U. S. Application Ser. No. 880,996 filed Nov. 28, 1969 and now U. S. Pat. No. 3,633,873, Jan. 11, 1972.

The present invention relates to an improved gate valve structure and, more particularly, to a gate valve structure wherein telescoping upper and lower stems are provided for actuating the valve gate member, the stems threadedly engaging one another with the threads being protected from the fluid in the main at all positions of operation of the valve. Additionally, the present invention relates to an improved top construction for supporting the upper stem of such a valve structure when the same is non-rising.

Heretofore, various actuating means have been utilized for reciprocation of the valve gate element of a gate valve structure. While the prior art valve structures sometimes provided means for protecting the valve actuating means from line fluid, these structures did not provide such means which would protect the valve actuating means in all positions of the valve gate member. Consequently, the actuating means was subjected from time to time to the line fluid, and if dirt contacted the actuating means, it often interfered with the ease of operation of the valve structure. In addition, where corrosive elements were present in the line fluid, the actuating means often reacted to such corrosive elements, making the operating of the valve structure difficult and sometimes interfering completely with the same.

In addition to the above, gate valve structures have a non-rising upper stem extending from within to out of a bonnet for reception of an operating nut could not ordinarily have the upper stem seal changed with the gate element being in a predetermined position, otherwise the stem would fall down within the bonnet. Also, no means was usually provided to accurately control the positioning of the stem when assembling the same in the bonnet.

SUMMARY OF THE INVENTION

The gate valve structure of the present invention is primarily utilized in mains carrying fluid under high pressure. The gate valve structure includes a valve casing having a through-bore for the flow of fluid, a generally flat valve gate member which is hollow, and an actuating means for moving the gate member from a position across the through-bore, closing the same to an open position out of the through-bore. The actuating means includes a valve stem carried by the casing member and rotatable with respect thereto, but restrained against axial movement and a second valve stem extending upwardly through the hollow interior of the valve gate member and threadedly received in the first valve stem. The first valve stem has a smooth exterior surface which slidably receives the gate valve member and means are provided for wiping this surface clean, as well as for sealing this surface with the gate valve member at all positions of movement of the same, whereby the threads of the first valve stem and the second valve stem are protected from line fluid at all times.

In addition, the gate valve structure of the present invention includes means for supporting the gate valve member and its actuating means from the valve casing at all positions of the gate valve member when the operating nut has been removed from the upper valve stem, so that at least the upper stem seal can be removed and replaced. Means are also provided for insuring a positive load on the upper stem seal.

The valve casing is provided with a body member and a detachable bonnet member, the bonnet member having integrally cast lifting ears thereon which provide for easy assembly and disassembly of the bonnet of the body member.

DESCRIPTION OF THE DRAWINGS

FIG. 1 is a vertical, sectional view through the gate valve structure of the present invention, taken in a plane transverse of the through-bore of the same, and illustrating the valve gate member in the closed position;

FIG. 2 is an enlarged fragmentary view illustrating the means for wiping the upper valve stem and for sealing the upper valve stem with the valve gate member at all positions of the same, to thereby protect the threads between the upper valve stem and the lower valve stem;

FIG. 3 is a sectional view of the gate valve structure of FIG. 1, taken substantially on the line 3—3 of FIG. 1;

FIG. 4 is a vertical, sectional view partly in elevation of a modified gate valve structure of the present invention, the vertical, sectional view being taken in a plane parallel to the axis of the through-bore;

FIG. 5 is an enlarged, fragmentary view similar to FIG. 2 of the modified arrangement for wiping the upper valve stem and sealing the upper valve stem with the valve gate member.

DETAILED DESCRIPTION OF THE INVENTION

Figure 6:
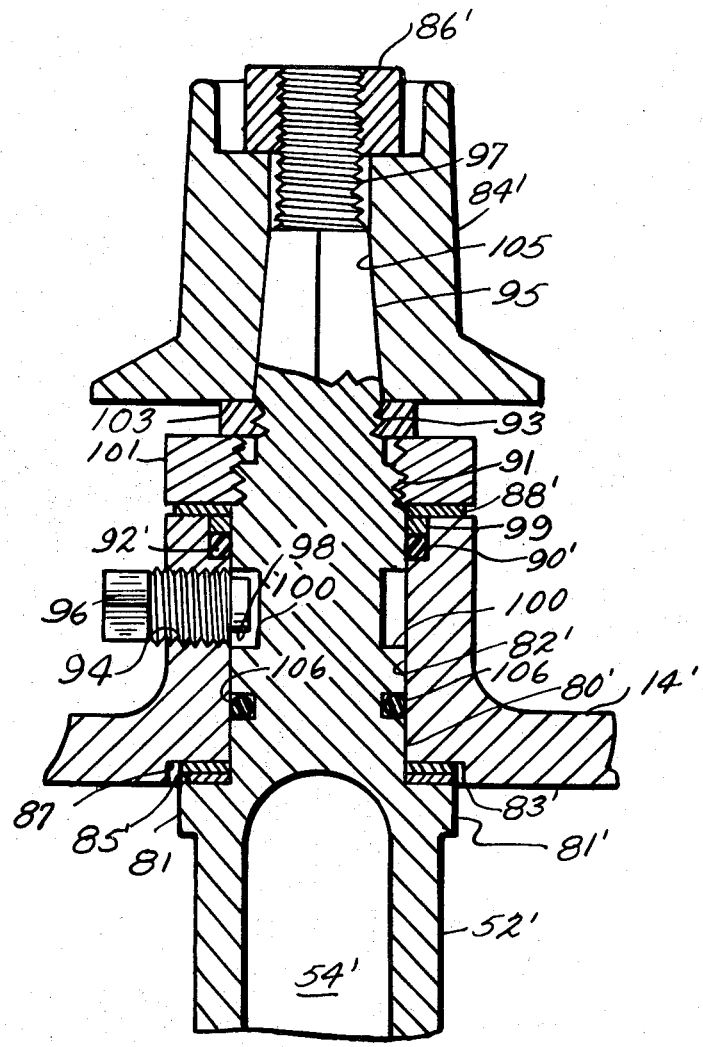
FIG. 6 is an enlarged fragmentary vertical sectional view illustrating a modification of the top construction for the gate valve of the present invention.

Referring now to the drawings wherein like characters and reference numbers represent like and similar parts, the gate valve structure of the present invention includes a valve casing generally designated at 10, the valve casing comprising a valve body member 12 and a detachable valve bonnet member 14. FIGS. 1 and 4 disclose gate valve structures having valve casings which are identical, the only differences being directed to the valve actuating means and the means of protecting the same at any time during operation of the valve. Consequently, where the disc valve structures shown in FIGS. 1 and 4 are identical, the same reference numerals will be used. Where there are differences in structure between FIGS. 1 and 4, the differences in FIG. 4 will be given a prime (') or a different reference numeral entirely.

FIG. 6 illustrates a modified top construction for the gate valve of the present invention and it may be used entirely or in part to replace the top constructions of the valves of FIGS. 1 and 4. Differences in elements will be given a prime (') or a different reference numeral.

The body member 12 of the valve casing 10 is provided with a through-bore 16 for the flow of fluid, the body member terminating at the ends of the through-bore in end flanges 18 and 20, respectively, that are adapted to be bolted to corresponding flanges of two sections of a main, not shown. Of course, means other than flanges 18 and 20 for connecting the valve body member 12 to the main may be utilized. Valve body member 12 is provided with an upwardly facing flange 22, which is arranged to receive a downwardly facing flange 24 of the bonnet member 14, with the flanges 22 and 24 being provided with a gasket 26 therebetween.

As will be best understood by reference to FIGS. 1 and 4, the bonnet member 14 and the body member 12, when assembled, define a chamber 30, which communicates or opens to the through-bore 16. The chamber 30 is provided for receiving a valve gate member 32 when the valve gate member 32 is moved from a closed position across the through-bore 16 to an open position where the through-bore is open for flow of fluid. In more detail, the valve gate member 32 is generally flat in shape and is provided with oppositely disposed ears 34 (FIG. 1) arranged to ride in opposed track or guideways 36 provided in the body member 12. The valve gate member 32 is preferably coated with a resilient or elastomeric material 38, such as rubber, rubber-like material, plastics, lead, asbestos, and the like. The coating 38 is arranged to engage a valve seat 40 provided in the body member 12, the valve seat 40 extending completely around the through-bore both on the upstream and downstream side of the valve gate member. As clearly shown in FIGS. 1 and 4, the valve gate member 32 is hollow and thus provided with a chamber 42 opening to the exterior of the upper portion of the valve gate member by a bore 44. The lower end of the chamber 42 is closed by a blow-out plug 46 and by the lower end of a lower valve stem 48 fixedly attached to the valve gate member by a pin 50. The lower valve stem 48 extends upwardly through the chamber and terminates adjacent the upper end of the bore 44, the lower valve stem 48 being exteriorly threaded.

Extending downwardly into the bore 44 of the valve gate member 32 is the lower end portion of an upper valve stem 52, the valve stem 52 being hollow, as indicated at 54, and having at least its lower end provided with interior threads for receiving the exterior threads of the lower valve stem 48. As will be described later in the specification, the upper valve stem 54 is rotatably supported in the bonnet member 14, but is restrained against axial movement with respect thereto, and consequently, when the upper valve stem 52 is rotated in one direction or the other, it will correspondingly cause the gate valve member 32 to reciprocate upwardly or downwardly, as the case may be.

The exterior surface of that portion of the upper valve stem 52 which slides in the bore 44 of the valve gate member 32 is smooth so as to provide no binding between the valve stem and the valve gate member when the valve gate member is reciprocating relative to the same and the valve stem is rotating. As best shown in FIG. 2, the chamber 42 within the valve gate member 32 is sealed at all times from the chamber 30 by providing an O-ring seal 56 between the exterior of the upper valve stem 52 and the wall of the bore 44. In this respect, the O-ring 56 is carried in an annular groove 58 provided in the wall of the bore 44, the O-ring 56 having a radial thickness slightly greater than the depth of the groove. The O-ring seal 56 being so positioned, provides a seal in all positions of movement of the valve gate member 32, and consequently the exterior threads of the lower valve stem 48, which are within the chamber 42, and the cooperating interior threads of the upper valve stem 52, are protected from line fluid at all times. This enhances the operation of the valve structure over a long period of time, as it eliminates an area where binding or increased friction could occur.

The O-ring seal 56 is protected against unusual wear by means of a non-corrosive split wiper ring 60 carried in a groove 62 provided in the wall of the bore 44 above the groove 58, the wiper ring having a relaxed inner diameter slightly less than the diameter of the upper valve stem 52. The non-corrosive wiper ring 60, which may be made of a stainless steel, copper, brass, plastic, plastic coated material or the like, engages the smooth exterior surface of the upper valve stem 52 and wipes therefrom any dirt, abrasive material, or the like, as the valve gate member 32 is moved upwardly toward the open position and this eliminates one unnecessary cause of wear of the O-ring seal. The material for the non-corrosive wiper ring is selected, dependent upon the type of line fluid.

Referring now specifically to FIGS. 4 and 5, there is disclosed a modification of the means for protecting the cooperating threads of the upper valve stem 52 and lower valve stem 48. In the arrangement disclosed in FIGS. 4 and 5, the valve gate member 32 is provided with a resilient coating 38' which covers the exterior of the same and which is further provided with an annular bead-like enlargement 39 that surrounds the outer end of the bore 44. The annular bead-like enlargement 39 has a relaxed interior diameter which is slightly less than the exterior diameter of the upper valve stem 52, so that when the gate valve structure is assembled, the valve stem 52, when inserted through the bead-like enlargement into the bore 44, slightly extends the bead-like enlargement. Thus, the bead-like enlargement 39 functions as a seal, such as the O-ring seal 56, to maintain the interior chamber 42 of the valve gate member 32 sealed from the exterior at all positions of movement of the same. Additionally, should any internal pressure build up in the chamber 42 due to line fluid eventually working into the same, such internal pressure can be relieved automatically as the annular bead-like enlargement will function as a valve to release the pressure to the exterior of the valve gate member. Conversely, if pressure becomes excessive in the chamber 30, the enlargement 39 will make a tighter seal with the exterior of the upper valve stem 52.

If desirable, a non-corrosive split sleeve type of wiper 41, having a bead 43 at its lower end, is slidably fitted on the valve stem 52 with its bead 43 snapped over the bead-like enlargement 39. The wiper fits in close sliding contact, but not in sealing engagement, with the exterior surface of the upper valve stem 52 and, thus, can wipe any dirt or abrasive material therefrom. In addition to its function as a means of wiping the stem 52, the wiper 41 has a secondary function of confining the enlargement 39 within its bead 43, so as to maintain the fluid of the enlargement with the exterior surface of the valve stem 52.

Referring now to FIGS. 1 and 4, it will be noted that the bonnet member 14 is provided with a pair of oppositely disposed ears or lugs 70 and 72 integrally cast with the same. The ears 70 and 72 each has an aperture 74 therein. Ears or lugs 70 and 72 function to provide means for hoisting the heavy bonnet member into position on the valve body member 12, so that the bolt means 76 can be fastened. Also, the ears or lugs 70 and 72 reinforce the bonnet member in the area where the bore 82 extends therethrough. By providing the hoisting means as ears cast on the bonnet member, it will be noted that should these ears be broken in handling of the bonnet member, or should they be destroyed by corrosion after burial of the gate valve structure for a period of time, they will in no way harm the valve operation.

The upper valve stem 52 is provided with an annular flange 81 bearing against at least one antifriction washer 83, which in turn bears against the interior of the bonnet member 14 snd a reduced portion 80, which extends through and out of a bore 82 in the bonnet member 14. An operating nut 84, having an outwardly tapered non-circular recess in one end, is arranged to fit over a complementary tapered non-circular portion 85 on the end portion 80 of the valve stem 52, the portion 85 extending externally of the bonnet member 14. The operating nut is held in position by a bolt 86 extending through the top of the same and threaded into the end of the valve stem 52. Intermediate the operating nut 84 and the bonnet member 14 is an anti-friction washer 88, which retains an O-ring seal 90 in an annular groove 92 provided in the upper outer end of the bore 82.

Beneath the groove 92, there is provided (FIG. 4) a threaded bore 94 extending radially inwardly through the wall of the bonnet member 14, the threaded bore 94 receiving an exteriorly threaded hold plug 96. The interior end 98 of the hold plug 96, which is reduced in diameter and unthreaded, is received in an annular circumferential groove 100 provided in the exterior surface of the reduced portion 80 of the upper valve stem 52. The valve stem 52 may rotate relative to the bonnet member 14 with interference from the end 98 of plug 96. By providing the hold plug 96 beneath the stem seal 90, the stem seal 90 may be replaced in any position of the valve gate member 32 as the valve stem 52 is supported on the end 98 of the plug when the nut 84 is removed. A lower O-ring 104 may be provided in an annular circumferential groove 106 on the reduced portion 80, to provide additional sealing means between the upper valve stem 52 and the bonnet member 14.

Referring to FIG. 6, there is disclosed a modification of the top construction for the gate valve of the present invention. Although the top construction is illustrated in FIG. 6 as being utilized with a particular type of nonrising stem arrangement for a gate valve, such as the one shown in FIG. 1, it will be appreciated that such a construction could be used in any valve assembly wherein there is a non-rising stem, the valve element being a gate valve or a plug valve or the like, which is reciprocated relative to the non-rising stem between opened, partially opened, and/or closed positions. The top construction arrangement is particularly adapted to use where the valve element is quite heavy and it is necessary that the non-rising stem be able to support the valve element in any position of its movement when it is desired to replace the stem seal without the stem falling down within the housing. Additionally, the arrangement provides for a closer control in the assembly of the stem in the bonnet of the valve without regard for manufacturing tolerances which could cause improper assembly.

In more detail, the bonnet 14' is substantially similar to the bonnet 14 in that it is provided with a bore 82' extending therethrough and opening at one end to the exterior of the bonnet and at its other end to the interior of the bonnet. As shown in the drawing, a nonrising valve stem 52', which is similar to the upper valve stem 52, previously described with respect to its lower end, is provided with an annular flange 81' defining an upwardly facing shoulder 85' between it and a reduced portion 80' extending through the bore 82'. Intermediate the shoulder 85', and the interior surface of the bonnet 14', as defined by an annular groove 87 surrounding the inner end of the bore, is at least one antifriction washer 83'. The end portion 80' of valve stem 52', which extends outwardly of the bonnet 14', is provided with exterior threads 91 for a portion of its length and then a second set of exterior threads 93 of reduced diameter for an additional portion of its axial length. Outwardly of the threads 93, the end portion 80' is provided with a tapered section 95, non-circular in cross section, and a threaded section 97.

As in the top construction illustrated in FIG. 1, the top construction of FIG. 6 includes a circumferential annular groove 100 in the section of the upper end portion 80' of valve stem 52', whih extends through the bore 82'. A hold plug 96 threaded through the threaded bore 94 has a reduced unthreaded interior end 98, which is received in the groove 100 and permits the valve stem 52' to be rotated, but does not permit the valve stem 52' to drop from the bore 82' when the retaining means are removed.

The reduced portion 80' has an annular circumferential groove 106 positioned beneath the groove 100, the groove 106 receiving an O-ring seal 104 of sufficient radial cross section to provide an initial seal between the stem and the bonnet. In this embodiment of the invention, the bonnet 14' is provided with an annular groove 92' surrounding the end of the bore 82' opening to the exterior. The groove 92' receives an O-ring seal 90' but it will be noted that the axial length of the groove 92' is greater than the radial thickness of the O-ring seal 90'. In order to insure a positive load being applied to the O-ring seal 90', a compensating annular spacer element 99 fits into the groove and is pressed downwardly by an anti-friction washer 88' when an adjusting collar 101 is threaded onto the threads 91.

The adjusting collar 101 can be tightened down against the anti-friction ring 88' so as to apply the desired friction between the stem 52' and the bonnet and so as to position the end portion 98 of the hold plug 96 intermediate the end walls of the groove 100 to prevent dragging thereon. While the adjusting collar 101 properly supports the stem 52' in position in the bonnet with the proper amount of friction thereon, it also functions in cooperation with the compensating spacer 99 to positively apply a load on the O-ring seal 90'. Once the stem 52' is properly positioned in the bonnet 14' by the adjusting collar 101, a lock or jam nut 103 is threaded onto the threads 93, until it jams against and locks the adjusting collar 101 in position.

An operating nut 84' having a tapered recess 105 complementary in non-circular cross section to the section 95 is slipped over the section 95 and held thereon by a nut 86'. It will now be seen that the operating nut 84' in the FIG. 6 environment does not apply a load to the O-ring seal 90', nor does it hold the stem 52' in the bonnet. The purpose of the nut 84' is merely to provide a means for applying a wrench or other operator to rotate the valve stem 52' relative to the bonnet 14'.

In both the top construction of FIG. 1 and of FIG. 6, the O-ring seals 90 and 90', respectively, may be removed and replaced, should this be necessary after failure of this seal and the primary seal 106. In each instance, the hold plug 96 permits such replacement of the seals 90 and 90' irregardless of the position of the valve element, in this case the valve gate member 32. Since the manufacturing tolerances of the operating nut 84 and the tapered non-circular end portion of the upper valve stem 52 of the FIG. 1 environment could possibly prevent the operating nut from applying sufficient pressure through the anti-friction washer 88 on the O-ring 90, it is often desired to utilize the compensating annular spacer element, such as the spacer element 99 of FIG. 6 between washer 88 and O-ring 90.

The arrangement shown in FIG. 6 has an advantage over the top construction shown in FIG. 1, in that manufacturing tolerances do not have to be maintained as close for the various parts, in order to insure proper positioning and friction between the non-rising stem 52' and the bonnet 14'. The arrangement of the top construction illustrated in FIG. 6, wherein the adjusting collar is used to prevent relative axial movement of the stem in the bore of the bonnet, permits accurate axial positioning of the stem, as well as providing proper friction between the stem and the bonnet for rotation of the stem. Additionally, the arrangement incorporates the annular spacer element above the O-ring and thus the adjusting collar can also be utilized to provide the proper load on the O-ring.

The terminology used in this specification is for the purpose of description and not limitation, the scope of the invention being defined in the appended claims.

What is claimed is:

1. In a valve assembly having a non-rising valve stem for actuating a valve element in a valve casing, the non-rising stem extending from within the valve casing through a bore in the valve casing to the exterior thereof, the improvement comprising an annular shoulder on said stem for operatively and continuously abutting against the interior of the valve casing, retaining means carried on an end portion of said stem exterior of the valve casing for holding said stem against axial movement but permitting rotative movement in the bore in said valve casing, said stem having a circumferential groove on a portion thereof in said bore, first sealing means between said bore and the portion of the valve stem in said bore at a location adjacent where said stem extends from the bore to the exterior of said valve casing, said first sealing means having a predetermined load exerted thereon by said retaining means; a second sealing means between said bore and the portion of the valve stem in said bore providing a continuous seal at all positions of said valve, said second sealing means being spaced beneath said first sealing means, and means carried by said valve casing and cooperating with the circumferential groove to permit said valve stem to be rotated but preventing axial movement of said valve stem when said retaining means is removed to replace said first sealing means, said second sealing means permitting replacement of said first sealing means in full open, full closed and any intermediate position of said valve assembly.

2. In a valve assembly having a non-rising valve stem for actuating a valve element in a valve casing, the non-rising stem extending from within the valve casing through a bore in the valve casing to the exterior thereof, the improvement comprising an annular shoulder on said stem for operatively abutting against the interior of the valve casing, retaining means carried on an end portion of said stem exterior of the valve casing for holding said stem against axial movement but permitting rotative movement in the bore in said valve casing, said stem having a circumferential groove on the bore in said valve casing, sealing means between said bore and the portion of the valve stem in said bore, said sealing means having a predetermined load exerted thereon by said retaining means; and means carried by said valve casing and cooperating with the circumferential groove on the portion of said valve stem in the bore of said valve casing, said last mentioned means permitting said valve stem to be rotated but preventing axial movement of said valve stem when said retaining means is removed to replace said sealing means, and said last mentioned means including a hold plug member extending through a threaded bore in said valve casing, and in which said sealing means includes an annular groove in the valve casing surrounding said bore at its end opening to the exterior of the valve casing and an O-ring seal positioned in said groove, said O-ring seal having a radial thickness less than the axial extent of said annular groove, an annular spacer element at least partially positioned in said annular groove against said O-ring seal, said spacer element being urged by said retaining means against said O-ring to apply a predetermined load thereon.

3. In a valve assembly having a non-rising valve stem for actuating a valve element in a valve casing, the non-rising stem extending from within the valve casing through a bore in the valve casing to the exterior thereof, the improvement comprising an annular shoulder on said stem for operatively abutting against the interior of the valve casing, retaining means carried on an end portion of said stem exterior of the valve casing for holding said stem against axial movement but permitting rotative movement in the bore in said valve casing, said stem having a circumferential groove on the bore in said valve casing, sealing means between said bore and the portion of the valve stem in said bore, said sealing means having a predetermined load exerted thereon by said retaining means; and means carried by said valve casing and cooperating with the circumferential groove on the portion of said valve stem in the bore of said valve casing, said last mentioned means permitting said valve stem to be rotated but preventing axial movement of said valve stem when said retaining means is removed to replace said sealing means, and said retaining means including an adjusting collar threadedly received on the end portion of said stem extending from said valve casing and a lock nut also threadedly received on the end portion of said stem and jammed against said adjusting collar to lock the same in a predetermined position and including an operating nut carried on the end portion of said valve stem outwardly of said lock nut, said operating nut being utilized for rotating said valve stem.

4. A valve assembly as claimed in claim 3, including an anti-friction washer inserted between said adjusting collar and said valve casing, and in which said sealing means comprises an annular groove extending about the bore in said valve casing at its end opening to the exterior thereof, an O-ring seal in said groove, and a compensating spacer element at least partially in said groove and urged against said O-ring by said anti-friction washer so as to apply a predetermined load to said O-ring.

* * * * *